US005346718A

United States Patent [19]

Thorgersen et al.

[11] Patent Number: 5,346,718

[45] Date of Patent: Sep. 13, 1994

[54] ELECTROLUMINESCENT LAMP CONTACTS AND METHOD OF MAKING OF SAME

[75] Inventors: Harold Thorgersen, Woodbury; Lyman Daigle, Bethlehem, both of Conn.

[73] Assignee: Timex Corporation, Middlebury, Conn.

[21] Appl. No.: 58,337

[22] Filed: May 10, 1993

[51] Int. Cl.$^{5}$ .......................... B05D 5/12; B32B 9/00; H01J 1/70; H01J 1/72

[52] U.S. Cl. .......................... 427/66; 313/502; 313/505; 313/506; 368/226; 427/261; 428/690; 428/917

[58] Field of Search .......................... 156/67, 153, 154; 427/66, 258–259, 261; 368/67, 226–227; 428/690, 917; 313/502, 505, 506

[56] References Cited

U.S. PATENT DOCUMENTS

| | | | |
|---|---|---|---|
| 2,798,821 | 7/1957 | Lehmann | 427/66 X |
| 2,900,545 | 8/1959 | Rulon et al. | 427/66 X |
| 3,110,837 | 11/1963 | Wollentin | 427/66 X |
| 3,290,536 | 12/1966 | Mager | 427/66 X |
| 4,667,128 | 5/1987 | Kamijo et al. | 313/505 |
| 4,707,419 | 11/1987 | Ogura et al. | 428/917 X |
| 4,717,606 | 1/1988 | Hale | 428/917 X |
| 4,775,964 | 10/1988 | Alessio et al. | 368/67 |
| 5,265,071 | 11/1993 | Thorgersen et al. | 368/67 |
| 5,276,382 | 1/1994 | Stocker et al. | 313/506 |

*Primary Examiner*—Michael W. Ball
*Assistant Examiner*—Adrienne C. Johnstone
*Attorney, Agent, or Firm*—William C. Crutcher

[57] ABSTRACT

The method of providing a pair of contact terminals on the back side of an electroluminescent (EL) lamp, of the type which has EL material between front and back conductive layers, which are disposed on a transparent substrate. A bump of conductive material deposited on the front conductive layer is insulated from the back conductive layer for providing a contact terminal on the back of the EL lamp which is connected to the front conductive layer. A preferred embodiment includes the further steps of adding an extension which relocates the back connection to a different place on the back of the EL lamp.

5 Claims, 3 Drawing Sheets

ELECTROLUMINESCENT LAMP CONTACTS AND METHOD OF MAKING OF SAME

BACKGROUND OF THE INVENTION

This invention relates generally to electroluminescent lamps and more particularly to an improved method and structure for making electrical connections to an electroluminescent lamp from only one side of the lamp.

Electroluminescent lamps are generally constructed as laminated or layered structures. Electroluminescent lamps function by application of an electrical potential to two conductive layers separated by an electroluminescent layer, which may comprise electroluminescent particles fixed in a resin binder.

Electroluminescent lamps have been modified to provide a lighted watch dial, as disclosed in U.S. Pat. No. 4,775,964 issued Oct. 4, 1988 to Alessio et al and assigned to the present assignee. While it is easy to make one of the electrical contacts to the back electrode comprising a conductive area on the underside of the electroluminescent watch dial, it is more difficult to make the other electrical contact to the front electrode, since this is a conductive layer which is embedded between other layers. Therefore it has been either necessary to omit part of the electroluminescent material to expose the front electrode, as shown in the aforesaid Alessio et al patent, or to provide a special overlap area extending beyond the normal periphery of the lamp.

An improved electroluminescent watch dial support and connector assembly is shown in the co-pending application of Thorgersen et al, Ser. No. 08/012,494 filed Feb. 2, 1993 now U.S. Pat. No. 5,265,071 issued Nov. 23, 1993 and assigned to the present assignee, employing special tabs extending beyond the dial periphery for making electrical contact. However it would be desirable to make electrical contact to both of the EL electrodes from any location on the back of the EL lamp without regard to the location of the lamp periphery.

It should be recognized that wherever electroluminescent material is missing, there is an objectionable dark spot on the lamp, since there are no electroluminescent particles to luminesce. In the case of an electroluminescent watch dial, it is preferable that the entire area used for observing the timekeeping numbers or other indicia be lighted without the presence of such a dark spot. However, there are some areas near the center of the watch dial in which a dark spot may be permitted without interfering with the aesthetic qualities of the timepiece. It would be desirable to provide a means for manufacturing an electroluminescent watch dial, in which the dark spot could be located wherever desired, and which also would permit electrical connection to both front and back electrode from any location on the rear of the electroluminescent watch dial.

Accordingly, one object of the present invention is to provide an improved electroluminescent lamp and method of making same, with electrical contacts on only one side of the lamp.

Another object of the invention is to provide an improved electroluminescent watch dial in which the electrical contacts and dark spot may be located at any desired location on the dial.

SUMMARY OF THE INVENTION

Briefly stated, the invention in its broadest form is practiced by providing a transparent substrate with a first conductive layer, depositing a bump of conductive material on the first conductive layer, depositing an electroluminescent layer on the first conductive layer including an isolating portion surrounding the bump, depositing a second conductive layer on the electroluminescent layer so as not to make electrical contact with the bump, and providing the bump with an exposed conductive surface for making electrical contact thereto on the back side of the EL lamp opposite the substrate.

The invention further includes subsequent processing by adding successive alternating layers of selectively shaped insulating material and conducting material in such a manner as to provide access to the front electrode layer and the rear electrode layer at locations on the lamp which are removed from the location of the dark spot.

DRAWINGS

The invention, both as to organization and to method of practice, together with further objects and advantages thereof, will best be understood by reference to the following specification, taken in connection with the accompanying drawings, in which:

FIG. 1 is an enlarged side elevational drawing in cross section of an electroluminescent lamp in the initial process of manufacture, FIG. 2 is the same view at the completion of the initial process, FIG. 3 is an enlarged side elevational view in cross section of a modified form of the invention during the initial process of manufacture, FIG. 4 is the same view of the modified form at the completion of the initial process, FIG. 5 is an enlarged side elevational view in cross section of yet another modification illustrating a preferred form of the invention at completion of the initial process, FIGS. 6, 8, 10, 12, 14 and FIGS. 7, 9, 11, 13, 15 are a series of side elevational views and a series of plan views, respectively, of successive steps in subsequent processing of the EL lamp in its preferred form.

DESCRIPTION OF THE PREFERRED EMBODIMENT

Figure 1:
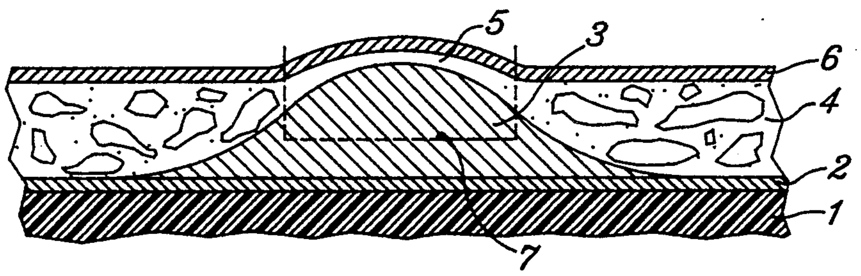

Referring now to FIG. 1 of the drawing, an electroluminescent lamp is shown in cross section through a part of the lamp. The drawing is not to scale, and the layers on top of the substrate are greatly enlarged for the purpose of illustration, it being understood that some of the insulating and conductive layers referred to herein are quite thin. As a general rule, the electroluminescent lamp thickness is only on the order of 0.15 to 0.20 mm. It may be cut and imprinted to make up a watch dial which is flexible, requiring a support, as set forth in the aforesaid Thorgersen et al patent application 08/012,404. However, the process described herein includes an electroluminescent lamp for any type of device, including LCD display backlights for any type of instrument.

The EL lamp comprises a transparent substrate 1 having deposited thereon a first conductive layer 2. Commercially, the substrate 1 with the conductive layer 2 already on it is commercially available in the form of Mylar (Registered trademark of E. I. duPont de Nemours & Co.) having an indium tin oxide (ITO) coating.

At the location where it is desired to make electrical contact with conductive coating 2, there is deposited a bump 3 of electrically conductive material. This may be applied by applying a droplet of electrically conductive paint, by silk screening, by vapor deposition of a conductive metal or any suitable process. Next, an electroluminescent layer 4 is applied over the conductive layer 2. Electroluminescent layer 4, as well known in the art, comprises electroluminescent particles such as ZnS:Cu which are thoroughly mixed in a polymerizable resin. The EL mixture is silk screened or otherwise uniformly coated on layer 2 so as to surround bump 3. In the arrangement of FIG. 1, the thickness of EL layer 4 is less than the height of the bump 3. However, a thin isolating layer 5 of the insulating resin covers the top of the bump. Finally, a second conductive layer 6, which may comprise conductive ink, preferably with reflective qualities is applied on top of EL layer 4, including the isolating portion 5, so that layer 6 does not contact layer 2.

Lastly, through a "milling" process, a small cutting tool or rotatable scouring device is utilized to remove material within the dotted line 7. This may be accomplished quite simply by means of milling, the location of the conductive bump 3 being ascertained by the raised surface.

Figure 2:
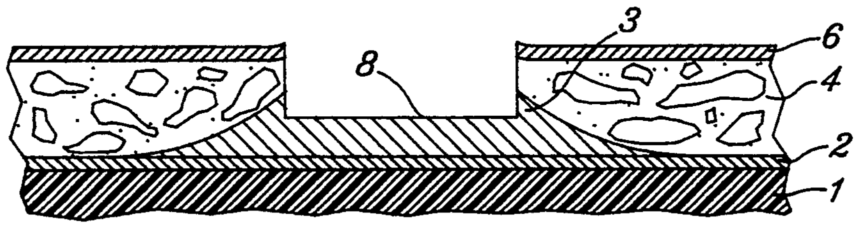

Reference to FIG. 2 illustrates the completion of the initial part of manufacture to show that the upper part of bump 3 has been adapted to provide an electrical contact area 8, which is electrically insulated from the conductive layer 6.

Figure 3:
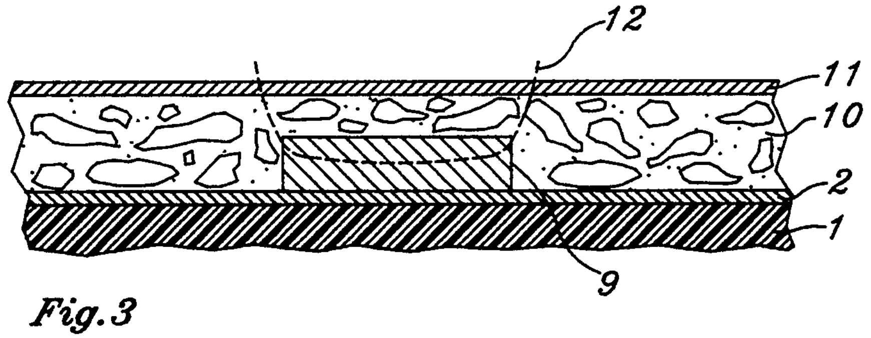
Figure 4:
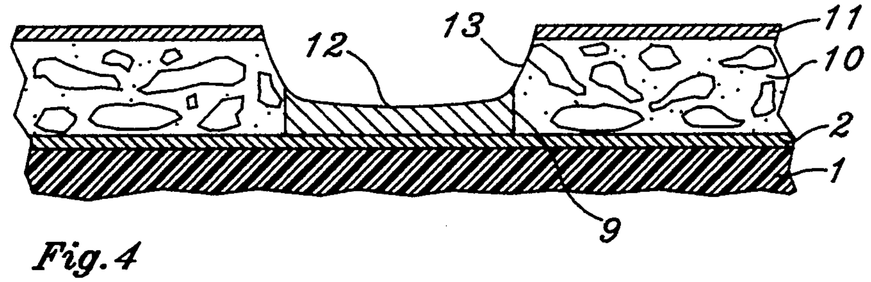

FIGS. 3 and 4 illustrate an alternative method. In this case, a low (or thinner) conductive bump 9 is applied and then completely covered by an electroluminescent layer 10 of uniform thickness. A second conductive layer 11 is applied, and an area is scooped out by a suitable tool or scouring device as indicated by the dotted line 12. FIG. 4 illustrates the completed modified form of the invention with the upper surface of bump 9 adapted as indicated by reference to numeral 12 to provide an electrical contact area connected to the first conductive layer 2 and electrically insulated from the second conductive layer 11 by means of the isolating portion 13 formed by the EL material.

Figure 5:
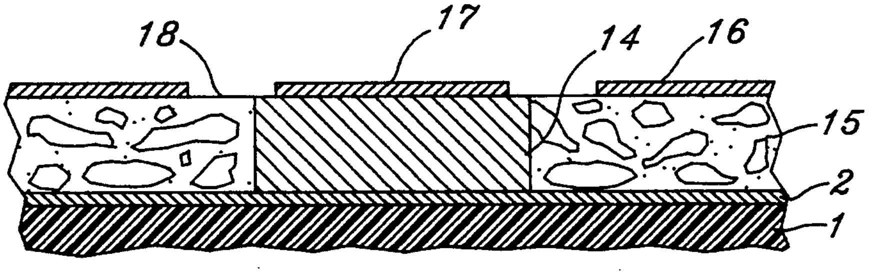

Referring now to FIG. 5, another method of adapting the bump of electrical material for electrical connection is shown, which is preferred for carrying out additional steps in the process of the invention. The transparent insulating substrate 1 with the first conductive layer 2 are provided as before. A bump 14 of electrically conductive material having a thickness substantially equal to a desired final thickness of the electroluminescent layer 15 is applied to the top of conductive layer 2 as before. Next, an electroluminescent layer of uniform thickness and the same thickness as conductive bump 14 is applied on top of conductive layer 2. Finally, a second conductive layer 16 is applied on top of EL layer 15, and at the same time, a conductive pad 17 is applied on top of the bump 14. Layer 16 and pad 17 may be put down at the same time with suitable masking to keep them separated. It is to be observed that layer 16 must define an opening around the periphery of bump 14 to provide an isolating portion 18 of the insulating EL material.

The method shown in FIG. 5 provides equivalent structures to the methods shown in FIGS. 1–4, but since level of layer 17 is the same as that of layer 16, it is adaptable to further processing as will be described.

Figure 6:
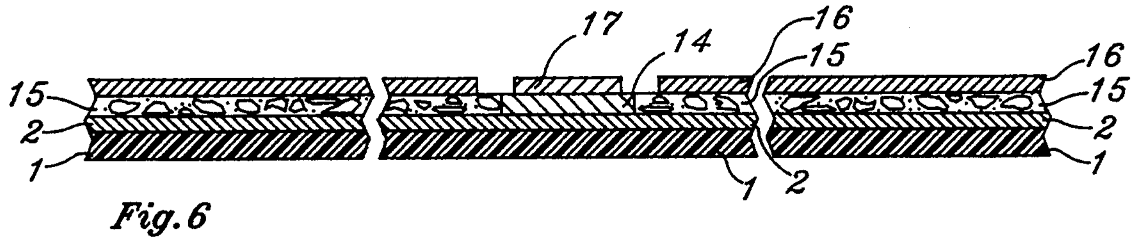
Figure 7:
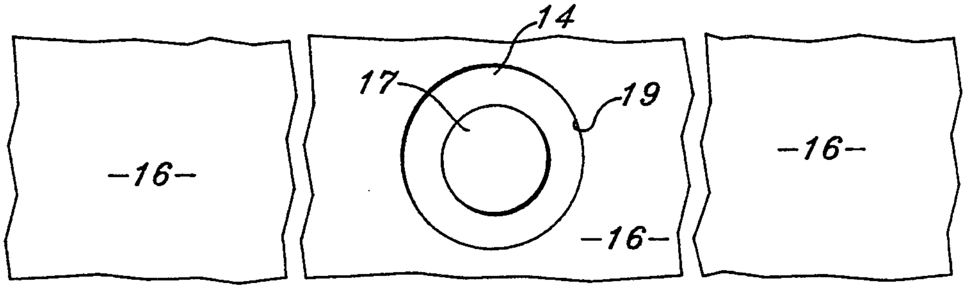

Reference to FIGS. 6 and 7 of the drawing illustrate the same stage of processing as indicated in FIG. 5, except that the drawing of the lamp has been broken into three segments to illustrate a large expanse of the electroluminescent lamp. The left hand segments of FIGS. 6 and 7 illustrate the area of the EL lamp where it is desired to place an electrical terminal connected to the back electrode (second conductive layer 16). The right hand segments illustrate the location on the electroluminescent lamp where it is desired to place an electrical terminal connected to the front electrode (first conductive layer 2). The central segments illustrate the location on the electroluminescent lamp where it is desired that the dark spot be located, i.e., where it is aesthetically acceptable.

Figure 8:
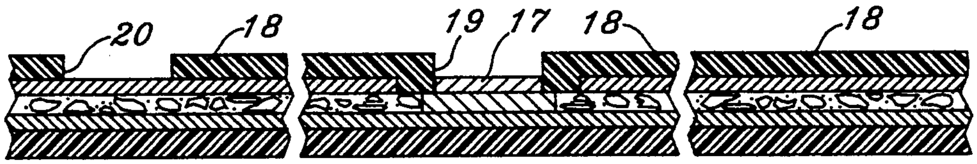
Figure 9:
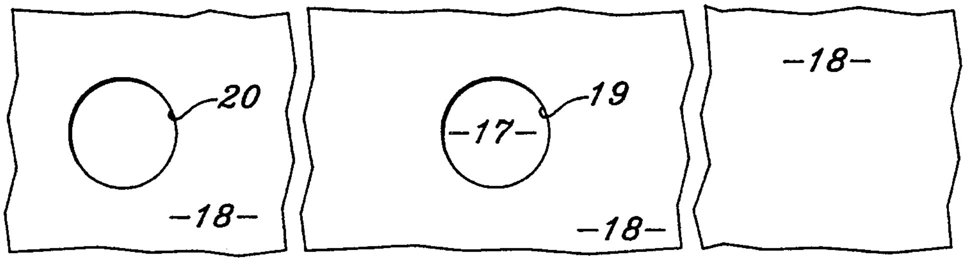
Figure 10:
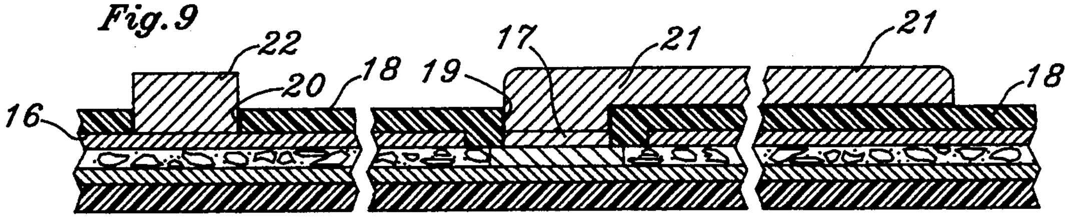
Figure 11:
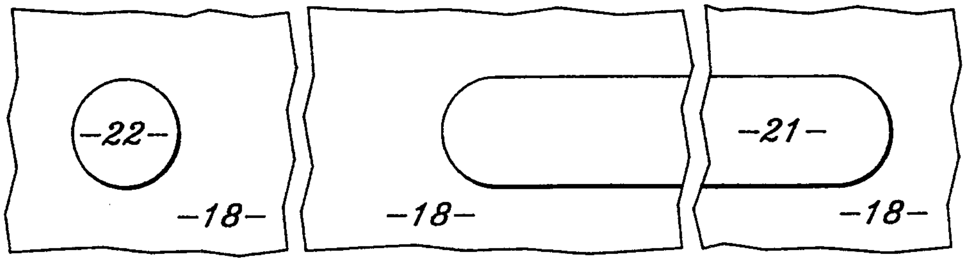

FIGS. 6 and 7 illustrate the lamp of FIG. 5.; FIGS. 8 and 9 illustrate the lamp in the next step of the process; FIGS. 10 and 11 illustrate the lamp in the next step of the process; and so forth. Only the reference numbers of the elements added or discussed at each successive step are shown on the drawing, so as not to confuse the description.

FIGS. 8 and 9 illustrate the next step of processing the partially completed lamp shown in FIGS. 6 and 7, by adding a layer of non-conductive material 18. This can be a coating of a compatible material such as the binder material used in layer 15. An opening 19 is left exposing the conductive pad 17, and an opening 20 is left at the desired location of the back electrode contact.

Referring to FIGS. 10 and 11, there is next applied a conductive extension layer 21 of conductive material and at the same time a button 22 of conductive material. These are applied at the same time using a suitable mask. Conductive extension layer 21 fills the opening 19 so as to make electrical connection with pad 17, and button 22 fills the opening 20 so as to contact conductive layer 16. Layer 21 extends to the location where it is desired that a terminal making electrical contact with the front layer be located.

Figure 12:
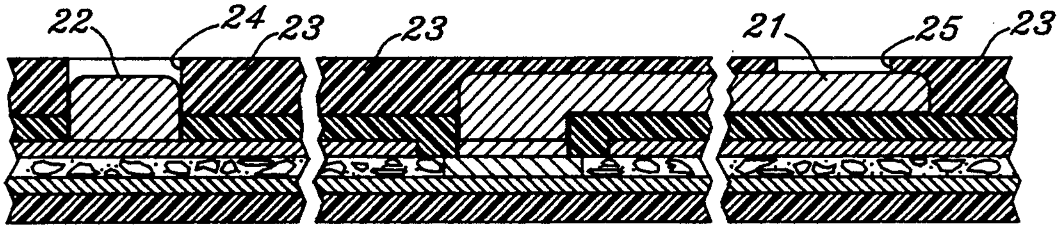
Figure 13:
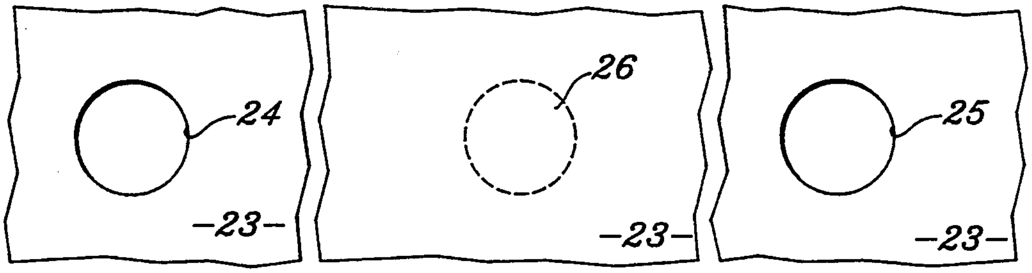

Referring to FIGS. 12 and 13 of the drawing, there is next applied a layer 23 of insulating material, leaving an opening 24 over the top of conductive button 22 and leaving an opening 25 over the top of conductive extension 21. It will be observed that the connection to the front electrode is now completely covered and obscured, but leaving a dark spot 26 due to the absence of electroluminescent material in that location.

Figure 14:
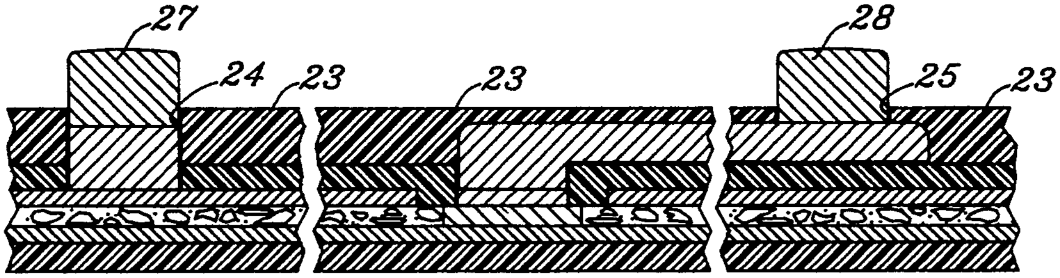
Figure 15:
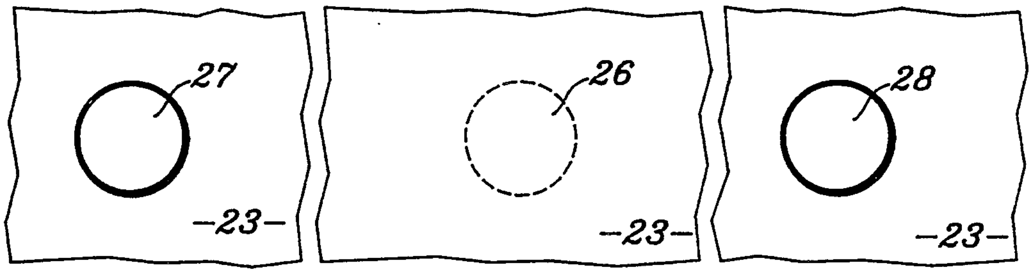

Lastly, referring to FIGS. 14 and 15, two final buttons 27, 28 of conductive material may be applied to fill the openings 24, 25. These provide electrical contact terminals which may be contacted from the rear of the EL lamp by elastomeric or other conductive connectors as is well known in the art.

Therefore the two terminals 27, 28 may be placed at any desired location on the back of the EL lamp, and the dark spot 26 may be located at any desired location on the EL lamp, all without regard to other design constraints. The method is particularly suitable and advantageous for an electroluminescent watch dial. The electrical contact terminals 27, 28 may be located at the outer edge of the movement, but within the periphery of the dial at any convenient location.

While there has been described what has been considered the preferred embodiment of the invention and several modifications thereof, other modifications will occur to those skilled in the art and it is desired to secure in the appended claims all such modifications as fall within the true spirit and scope of the invention.

We claim:

1. A process for providing a pair of electrical contact areas on one side of an electroluminescent lamp, comprising the steps of:

providing a transparent substrate having a first conductive layer thereon, depositing a bump of conductive material on said first conductive layer, depositing an electroluminescent insulating layer on said first conductive layer, including an isolating portion surrounding said bump, depositing a second conductive layer on said electroluminescent layer in noncontacting relationship with said bump, and providing said bump with an exposed conductive surface for making electrical contact thereto on the side of said electroluminescent lamp opposite that of the substrate, and depositing a pair of electrical contact areas on said lamp, one of which is electrically connected to said bump.

2. The process according to claim 1, wherein said deposited second conductive layer and said deposited electroluminescent layer together cover the top of said bump, and wherein the step of providing said bump with an exposed conductive surface includes the step of removing portions of said second conductive layer and said electroluminescent layer along with the top of said bump.

3. The process according to claim 1, wherein said electroluminescent layer is deposited so as not to cover the top of said bump, and wherein the step of providing said bump with an exposed conductive surface includes the step of depositing a pad of conductive material on the top of said bump at the same time as said second conductive layer is deposited, sad pad being spaced and electrically isolated from said second conductive layer.

4. The process according to claim 3, including the steps of:

depositing a layer of electrically non-conductive material over said second conductive layer so as to leave an opening to an exposed area in said second conductive layer at the desired location of a back electrode contact and an additional opening exposing said pad of conductive material, depositing a button of conductive material on said exposed area of said second conductive layer which fills said opening to provide a back electrode contact, and depositing simultaneously with said button of conductive material a conductive extension on said non-conductive layer so as to make electrical contact with said pad of conductive material and to fill said additional opening, said conductive extension being arranged to extend to a desired location for a front electrode contact.

5. The process according to claim 4, and further including the step of covering said conductive extension and said layer of electrically non-conductive material with an additional non-conductive layer so as to leave an opening over the top of said button of conductive material and an additional opening over the top of said conductive extension.

* * * * *